Nov. 14, 1944.    H. FISCHER    2,362,622
INJECTION ENGINE
Filed Nov. 10, 1941
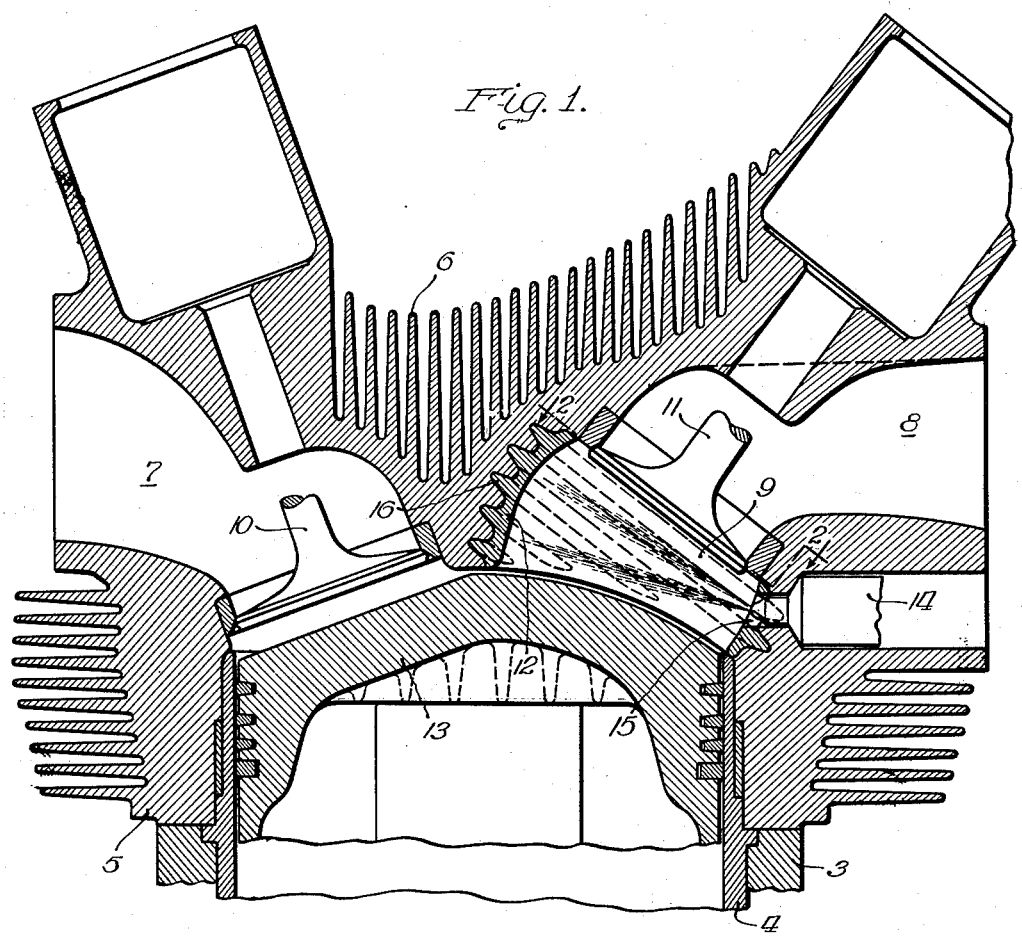
Fig. 1.
Fig. 2.
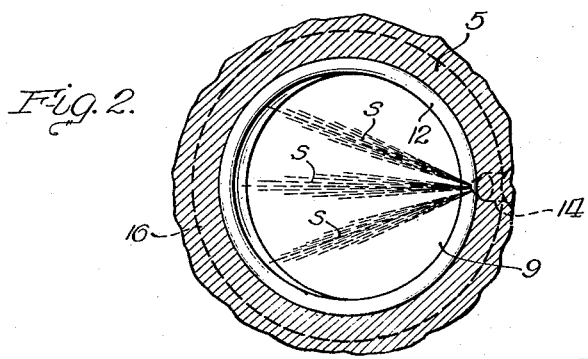
INVENTOR.
Hans Fischer Patented Nov. 14, 1944

2,362,622

UNITED STATES PATENT OFFICE 2,362,622

INJECTION ENGINE

Hans Fischer, Yonkers, N. Y., assignor to Lanova Corporation, Long Island City, N. Y., a corporation of Delaware Application November 10, 1941, Serial No. 418,453

1 Claim. (Cl. 123—191)

This invention relates to injection engines, and has to do with engines intended for use in airplanes and analogous purposes.

In airplane engines it is common practice to form the cylinder head and other parts of the engine of aluminum or aluminum alloy, thereby reducing the weight of the engine, an important consideration in airplane engines. In an injection engine having a cylinder head with a combustion chamber into which the fuel is injected, if the cylinder head be formed of aluminum or aluminum alloy impingement of the injected fuel spray on the wall of the combustion chamber causes corrosion of the aluminum and the formation of carbon, which is objectionable as interfering with proper operation of the engine. That is due, in large part, to the fact that aluminum metal, that is, aluminum and aluminum alloys, have higher heat conductivity than iron or steel, and the wall of the combustion chamber of an aluminum head is not at a sufficiently high temperature to assure instant evaporation of fuel particles striking that wall. Further, due to the relatively high heat conductivity of aluminum and aluminum alloy, a cylinder head constructed of aluminum metal necessitates a comparatively high compression ratio and the cylinder head has to be of thicker construction than would be necessary if a lower compression ratio were used.

My invention is directed primarily to the provision of an injection engine having an aluminum metal cylinder head and associated means whereby the above noted objections to the use of an aluminum metal cylinder head are avoided. More specifically, I provide an aluminum metal engine head having a combustion chamber therein, the latter being provided with a liner formed of a metal having a coefficient of expansion at least equal to, and preferably slightly greater than, the coefficient of expansion of the metal of the head, the liner having lower heat conductivity than the metal of the head and serving as a heat retainer effective for radiating heat into the combustion supporting air during the compression stroke of the piston, thereby raising the temperature level of the air and accelerating the chemical reaction of the combustion. That renders possible lower compression ratios than are permissible where an aluminum metal cylinder head is used without a combustion chamber liner of the character stated, so that the cylinder head may be made thinner thus effecting a saving in the aluminum metal. The combustion chamber liner is formed of an austenitic iron alloy having lower heat conductivity than the metal of the cylinder head and also having a coefficient of expansion at least equal to and preferably greater than the metal of the head, but such that the stresses to which the head is subjected incident to heating of the liner are within the elastic limit of the metal of the head, and the head is cast about the liner assuring intimate contact between the latter and the metal of the head, this contact being maintained at all times due to the coefficient of expansion of the liner relative to that of the metal of the head, assuring ready heat transfer between the liner and the head for maintaining the liner at the most efficient temperature while avoiding objectionably high temperatures thereof. In the case of exceptionally high speed engines, the liner preferably is provided with projections or fins extending into the metal of the head and increasing the area of contact therebetween and the liner, thus accelerating flow of heat from the liner to the head and preventing heating of the liner to an objectionably high temperature. Further objects and advantages of my invention will appear from the detail description.

In the drawing:

Figure 1 is a vertical axial sectional view through the upper end portion of a cylinder and the cylinder head of an injection engine embodying my invention, certain parts being shown in elevation; and Figure 2 is a fragmentary sectional view taken substantially on line 2—2 of Figure 1, showing the combustion chamber and liner and adjacent portions of the head.

I have illustrated my invention, by way of example, as embodied in an injection engine comprising a cylinder 3 provided with a liner 4, and a cylinder head 5 bolted or otherwise suitably secured to and overlying the cylinder, head 5 having a bore receiving the upper portion of cylinder liner 4, which may be supported in position in any known manner. Head 5 is formed of an aluminum metal, that is, aluminum or an alloy thereof, and is provided with cooling fins 6. Cylinder 3 may likewise be formed of an aluminum metal, or of any other suitable metal, and provided with cooling fins, the engine being air cooled. If desired, the engine may be cooled in any other suitable manner, as by means of a liquid coolant, as is well known.

Head 5 is provided with an air intake passage 7 opening downward into the cylinder bore, defined by cylinder liner 4, at one side thereof. Head 5 is further provided with an exhaust passage 8 opening through the roof of a combustion chamber 9 formed in head 5 and opening downward into the cylinder bore at the other side thereof. Passages 7 and 8 are controlled by intake and exhaust valves 10 and 11, respectively, mounted and operated in a known manner in proper timed relation to operation of the engine.

Combustion chamber 9 is provided with a liner 12 of substantially circular shape in cross section and bulged outward as shown. The metal of head 5 is cast about liner 12, assuring intimate contact between the latter and the metal of the head so that transfer of heat from the liner to the head is not objectionably retarded. The metal of liner 12 is an austenitic iron alloy which has a heat conductivity materially lower than the heat conductivity of the metal of head 5, and also has a coefficient of expansion at least equal to and preferably slightly greater than the coefficient of expansion of the metal of head 5. The latter, as previously noted, is formed of an aluminum metal, either aluminum or an alloy thereof, there being numerous aluminum alloys suitable for the purpose. There are also various austenitic iron alloys. As noted, the metal of the head and the metal of the liner 12 are so selected with respect to their heat conductivity and coefficient of expansion, that the liner is of lower heat conductivity than the metal of the head and has a coefficient of expansion at least equal to and preferably slightly greater than that of the metal of the head, assuring at all times intimate contact between the liner and the head. The proper metal or alloy in each case can readily be determined by a metallurgist knowing the above stated requirements, it being noted that the coefficient of expansion of the combustion chamber liner 12, while preferably slightly greater than the coefficient of expansion of the metal of head 5, should be such that the stresses to which the head is subjected incident to heating of the liner are within the elastic limit of the metal of the head so as to avoid subjecting the head to objectionable stresses and possibly causing cracking thereof.

As an example of the composition of a known aluminum alloy suitable for use in engine heads embodying my invention, the following particulars are given:

| | | |
|---|---|---|
| Copper | per cent | 1.4 |
| Silicon | do | 7.0 |
| Magnesium | do | .5 |
| Nickel | do | .8 |
| Manganese | do | .8 |
| Aluminum | do | 89.5 |
| Coefficient of expansion per °C | | .000019 |

As an example of the composition of a known austenitic iron alloy suitable for use in liners for engine heads embodying my invention, the following particulars are given:

| | | |
|---|---|---|
| Total carbon | per cent | .08–.20 |
| Silicon | do | .75 |
| Manganese | do | .60 |
| Chromium | do | 17.00–19.00 |
| Nickel | do | 7.00–9.00 |
| Iron | do | 75.92–70.45 |
| Coefficient of expansion per °C | | .000020 |

A piston 13 operates in the cylinder liner 4 and an injection nozzle 14 is mounted in cylinder head 5, in a suitable known manner, the tip of this nozzle extending through an opening 15 in liner 12 and being provided with ports disposed to inject fuel into chamber 12 transversely thereof, in the form of sprays s. Suitable means is provided for supplying fuel to the nozzle 14 under pressure and for timing the injection, as is well known.

In the operation of the engine, as the piston 13 approaches its inner dead center position shown in Figure 1, fuel is injected into combustion chamber 9 transversely thereof and, in the continued in travel of piston 13, this fuel is ignited by the heat of compression, the combustion or working stroke of piston 13 then occurring, as is known. The liner 12 of combustion chamber 9 is quickly heated to a higher temperature than the head 5, and is maintained at this higher temperature by the flow of heat from the liner 12 to the metal of head 5. In that manner liner 12 is maintained at a higher temperature than head 5, during operation of the engine, and provides a heat source which radiates heat into the combustion air within chamber 9, during the compression stroke, thus raising the temperature level of the combustion air and thereby accelerating the chemical reaction of the combustion, which permits of the use of lower compression ratios than would be permissible if the liner 12 were not provided. The temperature at which liner 12 is maintained is such that any injected fuel striking the liner will be instantly evaporated, which further facilitates combustion and prevents the formation of carbon on the surrounding wall of the combustion chamber. That is conducive to rapid and complete combustion of the fuel, eliminates smoky exhaust conditions and is conducive to smoothness in operation of the engine. Further, the liner 12, being formed of an austenitic iron alloy, will not be corroded by any fuel impinging on this liner, further assuring that the surrounding wall of the combustion chamber 9 will be maintained in a clean and uncorroded condition, free from carbon deposit, conducive to efficient combustion and operation of the engine.

In the case of injection engines operating at exceptionally high speeds, I preferably provide the combustion chamber liner 12 with fin-like projections or fins 16 extending from its outer surface into the metal of cylinder head 5 in intimate contact therewith, providing increased area of contact between liner 12 and the metal of head 5. The provision of the fins 16 enables more rapid heat transfer between liner 12 and the metal of head 5 than occurs where the fins are not provided, thus preventing heating of liner 12 to an objectionably high temperature in engines of the character referred to, that is, engines of exceptionally high speed. As above noted, liner 12 has a much lower heat transfer factor, or heat conductivity, than the metal of head 5 and, in exceptionally high speed engines, overheating of liner 12 might occur if it were not provided with the fins 16 or equivalent elements. The extent of fins 16, or like members, may be varied depending upon the speed of the engine and the temperature at which it is desired to maintain liner 12. In the case of engines operating at moderately high speed, the fins 16 may be omitted.

As above indicated, it will be understood that changes in construction and arrangement of parts of my invention may be resorted to, without departing from the field and scope thereof, and I intend to include in this application, in which the preferred form only of my invention is disclosed, all such variations as fall within the scope of the appended claim.

I claim:

In an injection engine, a cylinder and a piston operating therein, a cylinder head of aluminum metal overlying said cylinder having a combustion chamber opening freely thereinto, an austenitic iron alloy liner for said chamber fitting tightly in said head in intimate heat conducting contact therewith with the metal of said head cast about said liner, the metal of said liner being of lower heat conductivity than that of said head and the coefficient of expansion of said liner and said head being so related as to maintain said intimate heat conducting contact when the liner is heated in the operation of the engine while avoiding subjecting said head to stresses in excess of the elastic limit of the metal thereof, and an injection nozzle for injecting fuel into said combustion chamber.

HANS FISCHER.